(12) United States Patent
Ono (10) Patent No.: US 10,116,823 B2
(45) Date of Patent: Oct. 30, 2018

(54) CLEANING DEVICE THAT REMOVES TONER AND PAPER POWDER, AND IMAGE FORMING APPARATUS

(71) Applicant: KYOCERA Document Solutions Inc., Osaka (JP)

(72) Inventor: Tomohisa Ono, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/878,779

(22) Filed: Jan. 24, 2018

(65) Prior Publication Data

US 2018/0220024 A1    Aug. 2, 2018

(30) Foreign Application Priority Data

Jan. 31, 2017 (JP) .................................. 2017-016050

(51) Int. Cl.
| | | |
|---|---|---|
| *G03G 15/16* | (2006.01) | |
| *H04N 1/00* | (2006.01) | |
| *B08B 1/00* | (2006.01) | |
| *G03G 21/00* | (2006.01) | |
| *B08B 1/02* | (2006.01) | |
| *H04N 1/29* | (2006.01) | |

(52) U.S. Cl.
CPC ......... *H04N 1/00909* (2013.01); *B08B 1/002* (2013.01); *B08B 1/005* (2013.01); *B08B 1/02* (2013.01); *G03G 21/0058* (2013.01); *H04N 1/29* (2013.01); *H04N 2201/0094* (2013.01)

(58) Field of Classification Search
CPC .. G03G 15/161; G03G 15/166; G03G 15/168; G03G 21/0058; G03G 21/10; G03G 2215/1647; G03G 2221/0026; G03G 2221/0042

USPC ................... 399/101, 353, 357, 358
See application file for complete search history.

(56) References Cited

U.S. PATENT DOCUMENTS

| | | | |
|---|---|---|---|
| 7,751,770 B2 * | 7/2010 | Miyamoto et al. | .......................... G03G 21/0058 399/357 |
| 8,280,295 B2 * | 10/2012 | Naruse et al. | ...... G03G 21/0035 399/353 |
| 9,772,583 B2 * | 9/2017 | Kikuchi | ............... G03G 15/161 |

FOREIGN PATENT DOCUMENTS

| | | |
|---|---|---|
| JP | 20120203331 A1 | 10/2012 |
| JP | 20120215701 A1 | 11/2012 |

* cited by examiner

*Primary Examiner* — William J Royer
(74) *Attorney, Agent, or Firm* — IP Business Solutions, LLC (57) ABSTRACT

A cleaning device includes a removal roller, a collecting roller, a blade, and a toner storage section. The removal roller and the collecting roller do not have relationship such that a rotation speed or a diameter of one of the removal roller and the collecting roller is an integral multiple of a rotation speed or a diameter of the other removal roller and collecting roller. A first outer circumferential region having a first surface roughness and extending in an axial direction of a second rotary shaft and a second outer circumferential region having a greater second surface roughness than the first surface roughness and extending in the axial direction of the second rotary shaft are provided on an outer circumferential surface of the collecting roller in a circumferential direction thereof. A width of the second outer circumferential region is smaller than a width of the first outer circumferential region.

8 Claims, 7 Drawing Sheets

CLEANING DEVICE THAT REMOVES TONER AND PAPER POWDER, AND IMAGE FORMING APPARATUS

INCORPORATION BY REFERENCE

This application claims priority to Japanese Patent Application No. 2017-016050 filed on Jan. 31, 2017, the entire contents of which are incorporated by reference herein.

BACKGROUND

This disclosure relates to a cleaning device for removing a remaining toner, and the like and an image forming apparatus including the cleaning device.

Known as a typical image forming apparatus is, for example, an electrophotographic image forming apparatus formed through five processes in which an uncharged photoconductor is uniformly charged (charging process), in which laser light based on a document copy is irradiated to a surface of the charged photoconductor to form a latent image of the document on the surface of the photoconductor (exposure process), in which the latent image is visualized with a toner (development process), in which the toner image formed through the visualization is transferred onto a recording medium such as paper loaded on an intermediate transfer belt (transfer process), and in which the transferred toner image is fixed on the recording medium (fixation process).

The toner remains on the intermediate transfer belt after the toner image has been transferred onto the recording medium, which therefore requires removal of this remaining toner before next image formation processing. Thus, various cleaning devices for removing a remaining toner in an image forming apparatus have been suggested and then put into practical use.

The cleaning device includes for example: a fur brush roller which cleans the surface of the intermediate transfer belt; a collecting roller which collects the toner adhering to the fur brush roller; a blade which abuts a circumferential surface of the collecting roller and which is provided for scraping off the toner collected by the collecting roller; and a toner storage section which temporarily stores the toner scraped off by the blade. The toner scraped off by the blade moves to the toner storage section, and the toner which has moved to the toner storage section is conveyed to one end part in the toner storage section by a conveyance screw and discharged to an outside of the cleaning device through an opening part formed at the one end part in the toner storage section.

SUMMARY

A technology obtained by further improving the technology described above will be suggested as one aspect of this disclosure.

A cleaning device according to one aspect of this disclosure includes a removal roller, a collecting roller, a blade, and a toner storage section. The removal roller rotating around a first rotary shaft extending widthwise of an image carrier while making contact with the image carrier to remove a toner and a paper powder remaining on the image carrier. The collecting roller makes contact with the removal roller while rotating around a second rotary shaft parallel to an axial direction of the first rotary shaft to collect the toner and the paper powder on the removal roller. The blade extends in parallel to an axial direction of the second rotary shaft, and makes contact with the collecting roller to scrape off the toner and the paper powder on the collecting roller. The toner storage section is partitioned from the removal roller and the collecting roller by a seal extending in parallel to the first rotary shaft and the second rotary shaft, and stores the toner and the paper powder collected by the collecting roller and scraped off by the blade. The removal roller and the collecting roller have no relationship such that a rotation speed or a diameter of one of the removal roller and the collecting roller is an integral multiple of a rotation speed or a diameter of another one of the removal roller and the collecting roller. Provided on an outer circumferential surface of the collecting roller in a circumferential direction of the collecting roller are: a first outer circumferential region having a predefined first surface roughness and extending in the axial direction of the second rotary shaft; and a second outer circumferential region having a greater predefined second surface roughness than the first surface roughness and extending in the axial direction of the second rotary shaft. A width of the second outer circumferential region in the circumferential direction is smaller than a width of the first outer circumferential region in the circumferential direction.

An image forming apparatus according to another aspect of this disclosure includes: an image formation section including the image carrier; and the cleaning device described above. The toner and the paper powder remaining on the image carrier are removed by the cleaning device.

DETAILED DESCRIPTION

Figure 1:
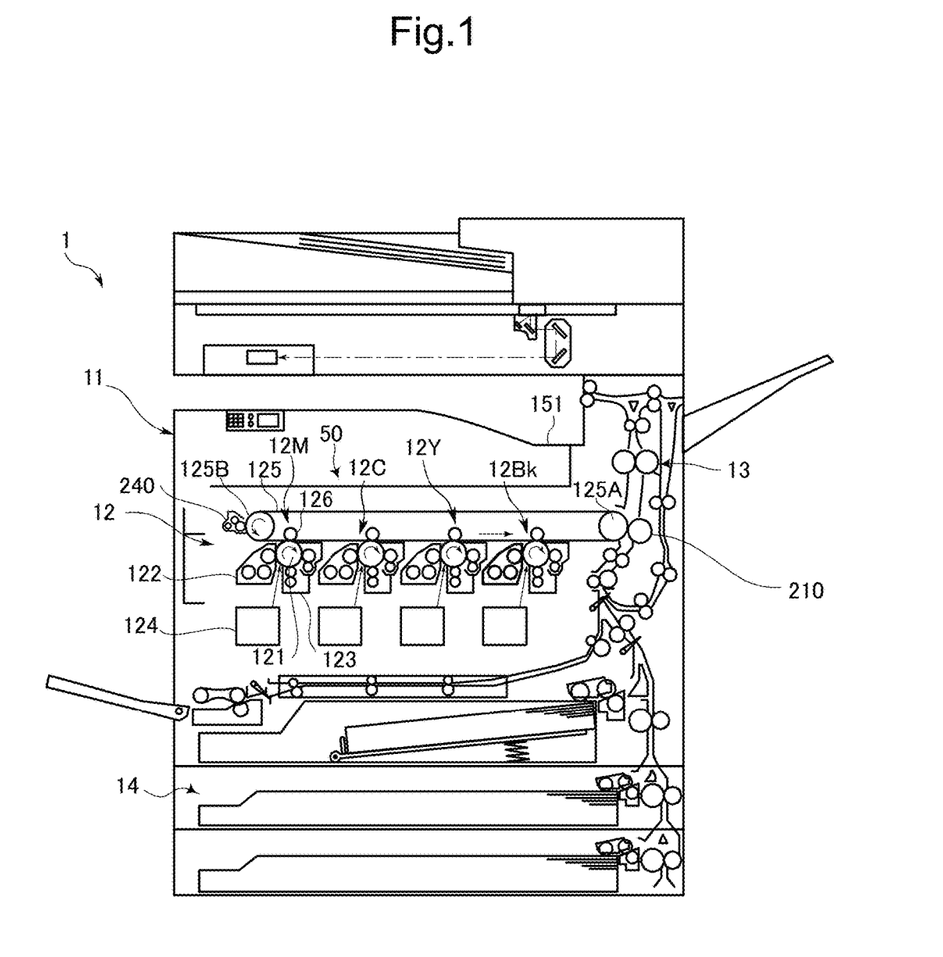
FIG. 1 is an elevation sectional view illustrating a structure of an image forming apparatus including a cleaning device according to one embodiment of this disclosure.

Hereinafter, a cleaning device 240 and an image forming apparatus 1 according to one embodiment of this disclosure will be described with reference to the drawings. FIG. 1 is an elevation sectional view illustrating a structure of the image forming apparatus 1 including the cleaning device 240 according to one embodiment of this disclosure.

The image forming apparatus 1 is, for example, a multifunction peripheral which includes a combination of a plurality of functions such as a copy function, a printer function, a scanner function, and a facsimile function. The image forming apparatus 1 includes, in an apparatus body 11, an image formation section 12, a fixing section 13, a paper feed section 14.

To perform image formation operation by the image forming apparatus 1, based on, for example, image data generated through document reading operation or image data stored in a built-in HDD, the image formation section 12 forms a toner image on recording paper fed from the paper feed section 14.

The image formation section 12 includes: a magenta image formation unit 12M, a cyan image formation unit 12C, a yellow image formation unit 12Y, and a black image formation unit 12Bk, an intermediate transfer belt (image carrier) 125, and a secondary transfer roller 210. The magenta image formation unit 12M, the cyan image formation unit 12C, the yellow image formation unit 12Y, and the black image formation unit 12Bk of the image formation section 12 each have a photoconductive drum 121, a developing device 122, a charging device 123, an exposure device 124, and a primary transfer roller 126. The intermediate transfer belt 125 is stretched around a driving roller 125A and a driven roller (tension roller) 125B.

To perform color printing, the image formation units 12M, 12C, 12Y, and 12Bk form toner images on the photoconductive drums 121 through charging, exposure, and development processes based on images formed of respective color components forming image data, and transfer the toner images onto the intermediate transfer belt (image carrier) 125 by the primary transfer rollers 126.

The toner images of the respective colors transferred onto the intermediate transfer belt 125 are superposed on each other on the intermediate transfer belt 125 through transfer timing adjustment, turning into a color toner image. At a nip part formed with the driving roller 125A with the intermediate transfer belt 125 in between, the secondary transfer roller 210 transfers the color toner image, which has been formed on the surface of the intermediate transfer belt 125, to recording paper conveyed from the paper feed section 14. Then the fixing section 13 fixes, on the recording paper through thermal fixation, the toner image formed on the recording paper. The recording paper which has gone through the fixation process and on which the color image has been formed is discharged onto a discharge tray 151.

A cleaning device 240 is provided at an intermediate transfer belt portion stretched on the driven roller 125B. The cleaning device 240 collects a toner remaining on an outer circumferential surface of the intermediate transfer belt 125. The cleaning device 240 also collects a paper powder remaining on the outer circumferential surface of the intermediate transfer belt 125.

Note that the intermediate transfer belt 125, the primary transfer roller 126, the driving roller 125A, the driven roller 125B, and further the cleaning device 240 are mounted in an intermediate transfer unit 50.

Figure 2A:
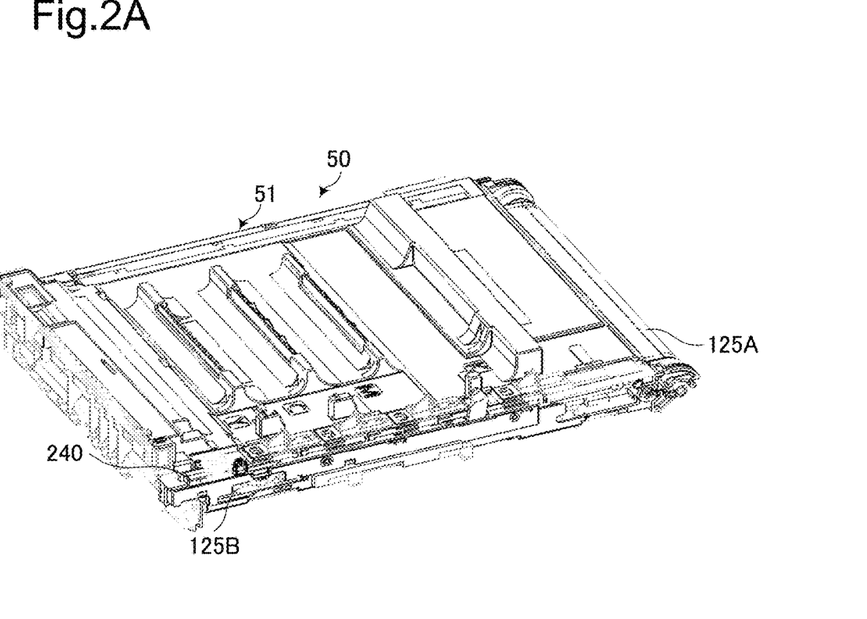
FIG. 2A is a perspective view illustrating outer appearance of an intermediate transfer unit including the cleaning device according to one embodiment of this disclosure.
Figure 2B:
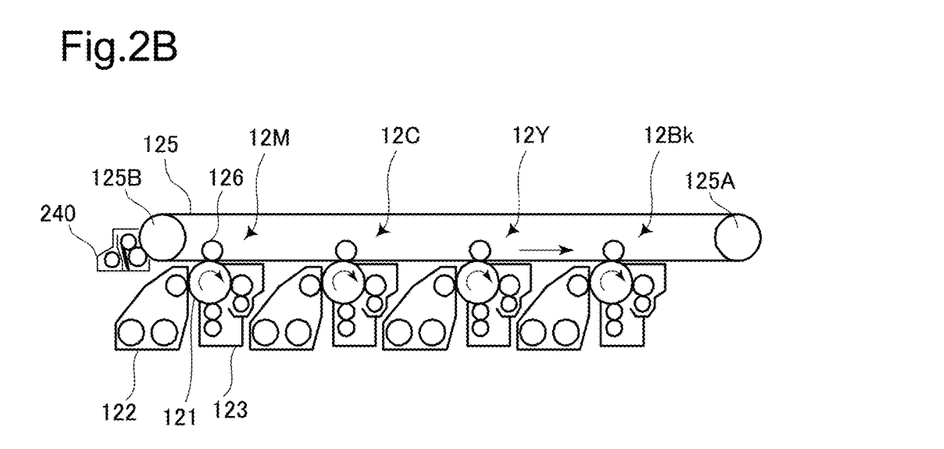
FIG. 2B is a sectional view illustrating configuration of the intermediate transfer unit and surroundings thereof.

FIG. 2A is a perspective view illustrating outer appearance of the intermediate transfer unit 50 including the cleaning device 240 according to one embodiment of this disclosure. FIG. 2B is a sectional view illustrating configuration of the intermediate transfer unit 50 and surroundings thereof. The intermediate transfer unit 50 is fitted above the image formation section 12 in the apparatus body 11. Mounted in the intermediate transfer unit 50 are the intermediate transfer belt 125, the primary transfer roller 126, the driving roller 125A, the driven roller 125B, and the cleaning device 240, as described above.

The intermediate transfer unit 50 includes a casing 51. The various mechanisms included in the intermediate transfer unit 50 are fitted in the casing 51. The casing 51 has one end part rotationally supporting the driving roller 125A and another end part supporting the driven roller 125B. The intermediate transfer belt 125 has a top and both sides covered by the casing 51 while stretched between the driving roller 125A and the driven roller 125B supported as described above. A bottom part of the intermediate transfer belt 125 in FIG. 2B is being exposed from the casing 51. With the intermediate transfer unit 50 installed in the apparatus body 11, the image formation units 12M, 12C, 12Y, and 12Bk of the respective colors are disposed in the apparatus body 11 located below the exposed intermediate transfer belt 125 portion.

Figure 3:
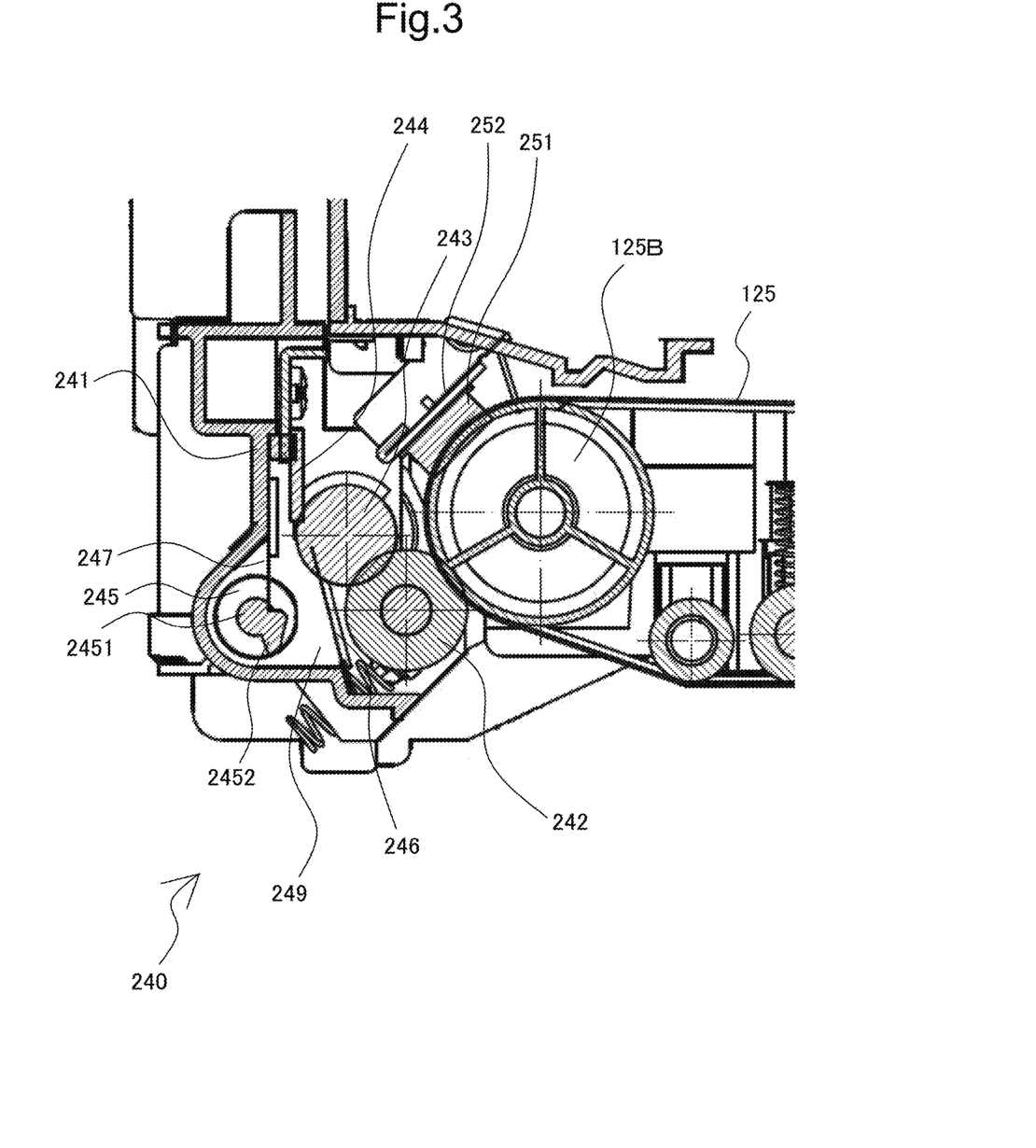
FIG. 3 is a sectional view illustrating configuration of the cleaning device according to one embodiment of this disclosure and surroundings thereof.

FIG. 3 is a sectional view illustrating configuration of the cleaning device 240 according to one embodiment of this disclosure and surroundings thereof. The cleaning device 240 includes a casing 241. Fitted in the casing 241 are: a fur brush roller (removal roller) 242, a collecting roller 243, a blade 244, a conveyance screw 245, a seal 246, a toner crushing member 247, and a contact member 251, all of which form the cleaning device 240. The casing 241 has a left bottom corner formed with a toner storage section 249.

The contact member 251 is arranged oppositely to the driven roller 125B with the intermediate transfer belt 125 in between. The contact member 251 is formed by, for example, a nonwoven fabric of a resin filament or the like. The contact member 251 is extended in parallel to the driven roller 125B, i.e., in a width direction of the intermediate transfer belt 125. The contact member 251 has the same dimension as a dimension in the width direction of the intermediate transfer belt 125. Moreover, the contact member 251 is attached to a pasted sheet metal (support member) 252 provided between a press spring (pressing member) (not illustrated) and the contact member 251, and the contact member 251 is fitted to the casing 241 with the pasted sheet metal 252 in between in a manner such as to be movable in a separation direction separating from the intermediate transfer belt 125. The pasted sheet metal 252 is formed to have a longer dimension than the contact member 251 (intermediate transfer belt 125) in the width direction described above.

Moreover, the contact member 251 makes contact with the outer circumferential surface of the intermediate transfer belt 125 while being pressed towards the intermediate transfer belt 125 with a predefined pressure by the press spring. Through the aforementioned contact, the contact member 251 causes, during running of the intermediate transfer belt 125, friction between the contact member 251 and the outer circumferential surface of the intermediate transfer belt 125, and provides electric charges to the toner remaining on the outer circumferential surface to charge the aforementioned toner.

Note that alternatively to the aforementioned description, a power supply device (not illustrated) may be connected to the contact member 251 and through voltage application from the power supply device to the contact member 251, the contact member 251 may charge the toner on the intermediate transfer belt 125.

The fur brush roller 242 is arranged oppositely to the driven roller 125B with the intermediate transfer belt 125 in between. The fur brush roller 242 rotates while making contact with the intermediate transfer belt 125 and electrically absorbs, from the surface (outer circumferential surface) of the intermediate transfer belt 125, the toner charged by the contact member 251 to clean the surface of the intermediate transfer belt 125. The fur brush roller 242 also scrapes off the paper powder from the surface of the intermediate transfer belt 125 with a physical force to clean the surface of the intermediate transfer belt 125. The fur brush roller 242 is formed, for example, by winding, for example, a nonwoven fabric of a resin filament around full circumference of a rotary shaft. The rotary shaft (a first rotary shaft) of the fur brush roller 242 extends in parallel to the driven roller 125B, i.e., in the width direction of the intermediate transfer belt 125, and is pivoted in the casing 241.

The collecting roller 243 is formed of, for example, metal, and makes contact with a surface of the fur brush roller 242 to electrically collect, from the fur brush roller 242, the toner collected by the fur brush roller 242. Moreover, the collecting roller 243 collects, with a physical force from the fur brush roller 242, the paper powder collected by the fur brush roller 242. The collecting roller 243 has a rotary shaft (a second rotary shaft) which extends in parallel to the fur brush roller 242, and is pivoted in the casing 241.

Moreover, a plurality of outer circumferential regions with different surface roughness levels are provided on an outer circumferential surface of the collecting roller 243, as described later on.

The blade 244 is formed of a flat plate-like member, and extends in parallel to the collecting roller 243. The blade 244 is fitted in the casing 241 in a manner such that a tip part of the blade 244 makes contact with the surface (outer circumferential surface) of the collecting roller 243, and scrapes off, from the surface of the collecting roller 243, the toner and the paper powder collected by the collecting roller 243. The scraped toner and paper powder drop and stay in the toner storage section 249.

The toner storage section 249 is partitioned from the fur brush roller 242 and the collecting roller 243 by the seal (backward flow prevention sheet) 246, and stores the toner and the paper powder collected by the collecting roller 243 and scraped off by the blade 244. The toner storage section 249 is provided with the conveyance screw 245.

The conveyance screw 245 extends in parallel to the collecting roller 243, and has a rotary shaft 2451 pivoted in the casing 241. A plurality of wings 2452 formed spirally for toner and paper powder conveyance are provided on a circumferential surface of the rotary shaft 2451 of the conveyance screw 245. The plurality of wings 2452 are formed at equal pitches each in an axial direction of the rotary shaft 2451 in a posture oriented at a predefined angle with respect to the rotary shaft 2451. The conveyance screw 245 conveys the toner and the paper powder in a direction in which the rotary shaft 2451 extends, that is, to one end part in the toner storage section 249 as a result of one rotation of the wings 2452 around the rotary shaft 2451. The toner and the paper powder conveyed in the manner described above move from an opening part (not illustrated) provided at the one end part in the toner storage section 249 to a waste toner tank (not illustrated).

The seal 246 is a sheet-like member, is formed of a flexible material, for example, urethane, and is partially fitted to the toner storage section 249 in a manner such as to make flexible contact with the surface of the collecting roller 243. At a position of contact made between a tip end part of the seal 246 and the surface of the collecting roller 243, while passing the toner adhering to the surface of the collecting roller 243, backward flow of the toner, which has been scraped off from the collecting roller 243 by the blade 244, from the toner storage section 249 towards the fur brush roller 242 is prevented. That is, the seal 246 functions as a backward flow prevention sheet which prevents backward flow of the toner towards the fur brush roller 242.

The toner crushing member 247 crushes the toner and the paper powder remaining in the toner storage section 249. The toner crushing member 247 is of preferably a material harder than the seal 246, and for example, a thin resin sheet of, for example, polyethylene terephthalate (PET) sized approximately 100 um is used. The toner crushing member 247 is fixed on an inner wall surface of the casing 241, and extends in a direction in which the rotary shaft 2451 of the conveyance screw 245 extends. The toner crushing member 247 is formed of, for example, a flexible synthetic resin material.

Figure 4A:
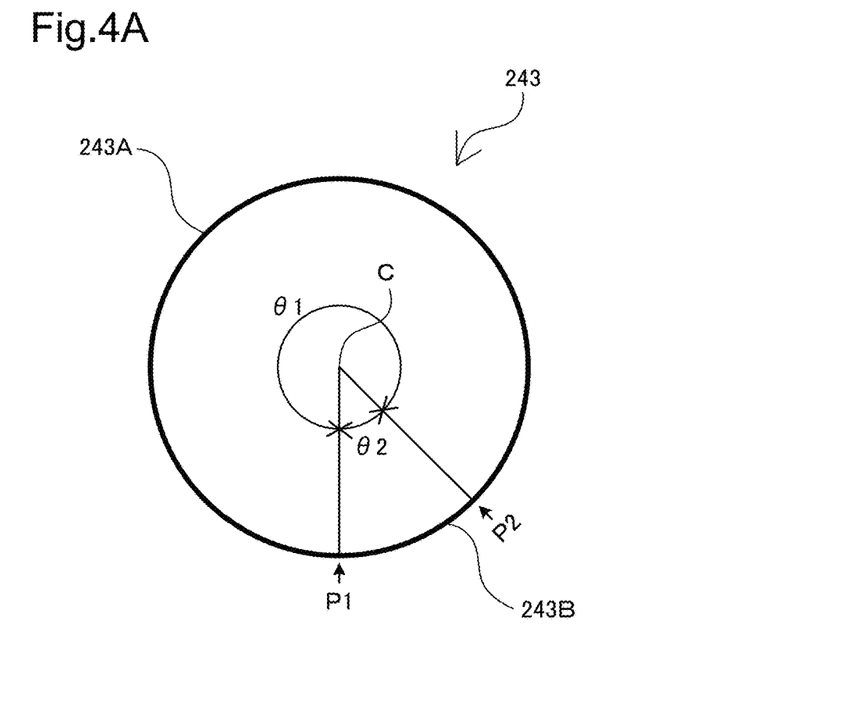
FIG. 4A is a plan view describing configuration of a collecting roller of the cleaning device according to one embodiment of this disclosure.
Figure 4B:
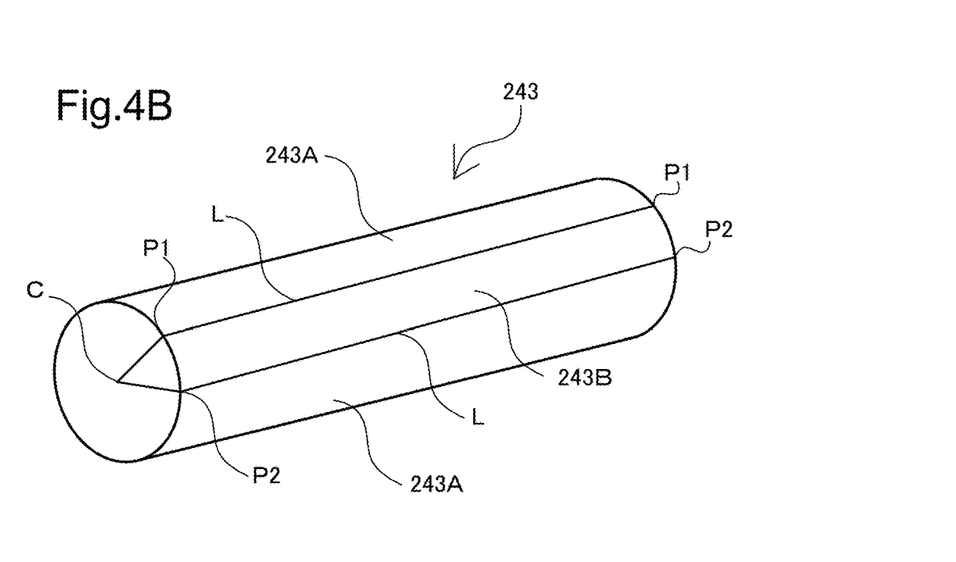
FIG. 4B is a perspective view describing configuration of the collecting roller of the cleaning device according to one embodiment of this disclosure.

Next, with reference to FIGS. 4A and 4B, the collecting roller 243 of the cleaning device 240 will be described. FIG. 4A is a plan view describing configuration of the collecting roller 243 of the cleaning device 240 according to one embodiment of this disclosure. FIG. 4B is a perspective view describing configuration of the collecting roller 243 of the cleaning device 240 according to one embodiment of this disclosure.

Provided on the outer circumferential surface of the collecting roller 243 in a circumferential direction of the collecting roller 243 are: a first outer circumferential region 243A which has a predefined first surface roughness and which extends in an axial direction of the second rotary shaft described above; and a second outer circumferential region 243B which has a larger predefined second surface roughness than the first surface roughness and which extends in the axial direction of the second rotary shaft. Moreover, a width of the second outer circumferential region 243B in the aforementioned circumferential direction is smaller than a width of the first outer circumferential region 243A in the aforementioned circumferential direction.

For example, as illustrated in FIGS. 4A and 4B, the first outer circumferential region 243A is a surface region of the outer circumferential surface of the collecting roller 243 extending clockwise (that is, a right rotation direction in FIG. 4A) from a point P1 located on the aforementioned outer circumferential surface of the collecting roller 243 to a point P2 located on the outer circumferential surface. A width of the first outer circumferential region 243A in the aforementioned circumferential direction is defined by a rotation center C of the collecting roller 243, a center angle θ1 formed by the points P1 and P2, and a dimension L in an axial direction of the collecting roller 243. Moreover, the second outer circumferential region 243B is a surface region of the outer circumferential surface extending counterclockwise (that is, a left rotation direction in FIG. 4A) from the point P1 to the point P2. A width of the second outer circumferential region 243B in the aforementioned circumferential direction is defined by the rotation center C, a center angle θ2 formed by the points P1 and P2, and the dimension L in the axial direction of the collecting roller 243. Then in the first outer circumferential region 243A and the second outer circumferential region 243B, as illustrated in FIG. 4A, the center angle θ2 is set to be smaller than the center angle θ1 whereby the width of the second outer circumferential region 243B in the aforementioned circumferential direction is smaller than the width of the first outer circumferential region 243A in the aforementioned circumferential direction.

Moreover, for example, a value within a range between 1.2 and 4.0 with ten-point average roughness Rz is used as the first surface roughness of the first outer circumferential region 243A. Consequently, the outer circumferential surface of the first outer circumferential region 243A is formed into a smooth shape, that is, a less uneven shape, which can therefore suppress abrasion of the tip part of the blade 244 by the outer circumferential surface of the first outer circumferential region 243A and can suppress a decrease in a life of the blade 244. Further, backward flow of an additive contained in the toner from the collecting roller 243 towards the intermediate transfer belt 125 via the fur brush roller 242 is reliably prevented as a result of passage of the additive through the blade 244 without being scraped off by the blade 244.

Moreover, for example, a value in a range between 3.0 and 6.0 with ten-point average roughness Rz is used as the aforementioned second surface roughness of the second outer circumferential region 243B. Consequently, in the second outer circumferential region 243B, the outer circumferential surface of the second outer circumferential region 243B is formed into a rough shape, that is, a greatly uneven shape, which therefore can improve a power of conveying the paper powder and can prevent the paper powder from jamming between the collecting roller 243 and the seal 246.

Note that in the collecting roller 243, for example, processing is applied to the outer circumferential surface of the metal material of the collecting roller 243, thereby forming the first outer circumferential region 243A and the second outer circumferential region 243B with the different surface roughness levels. For example, in the collecting roller 243, as a result of applying the processing to the entire outer circumferential surface of the aforementioned material, after the first outer circumferential region 243A is formed on the aforementioned entire surface, the processing is applied to part of this first outer circumferential region 243A whereby the second outer circumferential region 243B with the greater surface roughness than the first outer circumferential region 243A is formed.

Moreover, the collecting roller 243 does not have relationship such that a rotation speed or a diameter of the collecting roller 243 is an integral multiple of a rotation speed or a diameter of the fur brush roller 242. That is, the collecting roller 243 and the fur brush roller 242 do not have relationship such that the rotation speed or the diameter of either one of the collecting roller 243 and the fur brush roller 242 is an integral multiple of the rotation speed or the diameter of the other. As described above, since the collecting roller 243 and the fur brush roller 242 are configured in a manner such as to have no relationship such that one of the rotation speeds or the diameters is an integral multiple of the other, thus preventing continuous contact of the second outer circumferential region 243B with a same outer circumferential portion of the outer circumferential surface of the fur brush roller 242. Consequently, the first outer circumferential region 243A and the second outer circumferential region 243B can be brought into contact with one portion of the outer circumferential surface of the fur brush roller 242 in the circumferential direction, which can prevent variation caused in performance of toner and paper powder collection from the intermediate transfer belt 125 by the fur brush roller 242.

For example, in a case where the second outer circumferential region 243B is continuously in contact with the same outer circumferential portion of the outer circumferential surface of the fur brush roller 242, an amount of the paper powder adhering to the contacted outer circumferential portion described above may be remarkably smaller than an amount of the paper powder adhering to the outer circumferential portion of the outer circumferential surface of the fur brush roller 242 not in contact with the second outer circumferential region 243B. Thus, the performance in the toner and paper powder collection at the outer circumferential portion of the outer circumferential surface of the fur brush roller 242 not in contact with the second outer circumferential region 243B may remarkably deteriorate compared to performance in the toner and the paper powder collection at the outer circumferential portion of the outer circumferential surface of the fur brush roller 242 in contact with the second outer circumferential region 243B, causing variation in the collection performance of the fur brush roller 242. On the contrary, it is possible in this embodiment to prevent the continuous contact of the second outer circumferential region 243B with the same outer circumferential portion of the outer circumferential surface of the fur brush roller 242, which can therefore prevent the variation caused in the collection performance of the fur brush roller 242.

As described above, the collecting roller 243 and the fur brush roller 242 in the cleaning device 240 of this embodiment have no relationship such that the rotation speed or the diameter of either one of the two is an integral multiple of the rotation speed or the diameter of the other. Moreover, provided on the outer circumferential surface of the collecting roller 243 in the circumferential direction of the collecting roller 243 are: the first outer circumferential region 243A which has the predefined first surface roughness and which extends in the axial direction of the second rotary shaft; and the second outer circumferential region 243B which has the larger predefined second surface roughness than the first surface roughness and which extends in the axial direction of the second rotary shaft. The width of the second outer circumferential region 243B in the aforementioned circumferential direction is smaller than the width of the first outer circumferential region 243A in the aforementioned circumferential direction. Consequently, the power of paper powder conveyance by the collecting roller 243 can be improved with the simple configuration in the cleaning device 240 of this embodiment. Thus, it is possible in the cleaning device 240 of this embodiment to prevent paper powder jamming between the collecting roller 243 and the seal 246 to prevent toner backward flow towards the intermediate transfer belt 125. Moreover, since the toner backward flow towards the intermediate transfer belt 125 can be prevented as described above, it is possible in the image forming apparatus 1 of this embodiment to prevent occurrence of image failure attributable to the toner which has flown backward. Further, in the cleaning device 240 of this embodiment, the first outer circumferential region 243A is formed to be smaller than the second outer circumferential region 243B, which can therefore prevent unnecessary abrasion of the tip part of the blade 244 and suppress a decrease in the life of the blade 244.

Figure 5A:
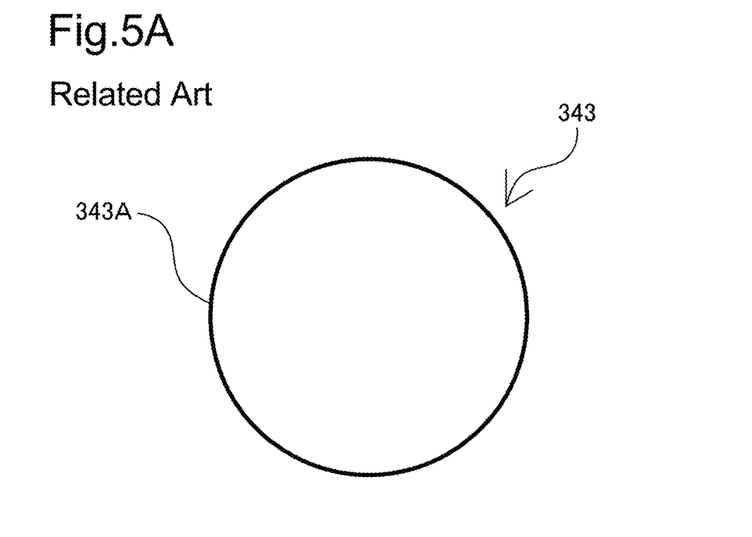
FIG. 5A is a diagram describing configuration of a collecting roller of a comparative example.
Figure 5B:
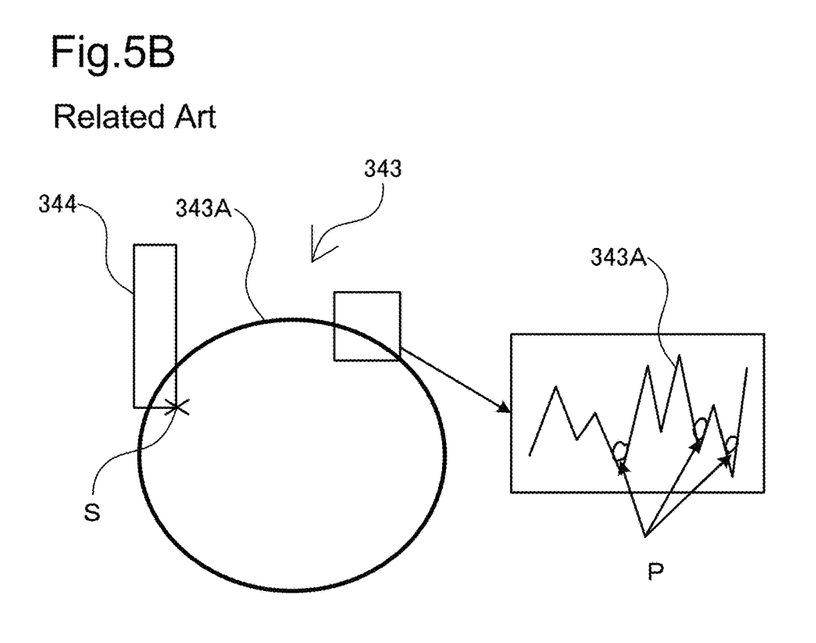
FIG. 5B is a diagram describing a problem found in the comparative example.

FIG. 5A is a diagram describing configuration of a collecting roller 343 of a comparative example. FIG. 5B is a diagram describing a problem found in the comparative example. As illustrated in FIG. 5A, an outer circumferential region 343A of an outer circumferential surface of a typical collecting roller 343 which does not have the first outer circumferential region 243A and the second outer circumferential region 243B as described above has a uniform surface roughness. For example, a value over 6.0 with ten-point average roughness Rz is used as the surface roughness of the outer circumferential region 343A of the outer circumferential surface of the collecting roller 343. As described above, when the surface roughness is set at a relatively rough value across the entire outer circumferential surface of the collecting roller 343, a surface of the outer circumferential region 343A is formed into a greatly uneven shape. Thus, as illustrated by "S" in FIG. 5B, a tip part of a blade 344 is easily abraded away by an uneven portion of the surface of the outer circumferential region 343A of the collecting roller 343. As a result, a life of the blade 344 may decrease. Moreover, as illustrated in FIG. 5B, for example, an additive P contained in the toner may enter a groove formed at the uneven portion of the surface of the outer circumferential region 343A and may be returned to the intermediate transfer belt through the fur brush roller without being scraped off by the blade 344. Thus, in a typical image forming apparatus, for example, a striped scratch may be formed by the returned additive P, which may result in failure to appropriately form an image.

Figure 6:
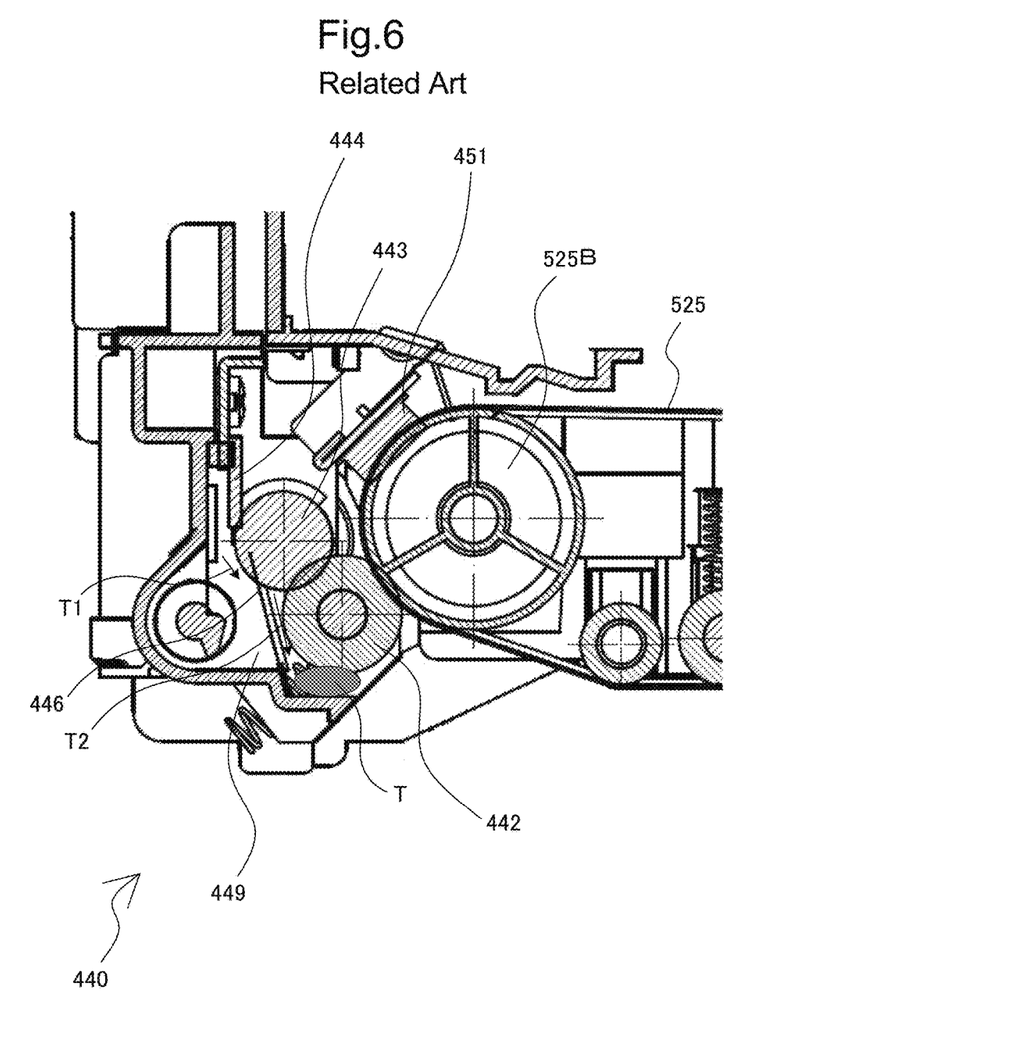
FIG. 6 is a diagram describing a problem found in another comparative example.

FIG. 6 is a diagram describing a problem found in another comparative example. In FIG. 6, unlike the comparative example illustrated in FIG. 5A, a value less than 1.2 with ten-point average roughness Rz is used as a surface roughness of an outer circumferential region of an outer circumferential surface of a collecting roller 443 in a typical cleaning device 440. When the collecting roller 443 with the outer circumferential surface formed by such a surface having a small surface roughness, that is, a smooth surface is used, paper powder conveyance power at the collecting roller 443 is insufficient, which may result in paper powder jamming between the collecting roller 443 and a seal 446. Specifically, in the typical cleaning device 440, when a driven roller 525B is turned, the paper powder may become stagnant between a contact brush 451 and an outer circumferential surface of an intermediate transfer belt 525, growing a large chunk. Then when this grown paper powder is conveyed to the intermediate transfer belt 525, is sequentially connected by a fur brush roller 442 and the collecting roller 443, and is further conveyed to an area between the collecting roller 443 and the seal 446 without being scraped off by a blade 444 as illustrated by an arrow T1, the conveyed paper powder may jam between the collecting roller 443 and the seal 446, and a small gap may be formed between the collecting roller 443 and the seal 446 due to the aforementioned paper powder jamming. Thus, the toner on the collecting roller 443 may not be stored in a toner storage section 449 and may pass through the aforementioned small gap to a bottom side of the fur brush roller 442, as illustrated by an arrow T2. Then when the passing toner is accumulated as illustrated by "T" of FIG. 6, the accumulated toner may make contact with the fur brush roller 442 and be thereby returned onto the outer circumferential surface of the intermediate transfer belt 525. As a result, image failure is caused by the returned toner in the image forming apparatus which uses the typical cleaning device 440.

On the contrary, the cleaning device 240 of this embodiment includes, on the outer circumferential surface of the collecting roller 243: the first outer circumferential region 243A which has the predefined first surface roughness (for example, the value in the range between 1.2 and 4.0 with the ten-point average roughness Rz); and the second outer circumferential region 243B which has the predefined second surface roughness (for example, the value in the range between 3.0 and 6.0 with the ten-point average roughness Rz). Thus, while improving the power of the paper powder conveyance by the collecting roller 243 to prevent the paper powder jamming between the collecting roller 243 and the seal 246, the cleaning device 240 of this embodiment can suppress the abrasion of the tip part of the blade 244 by the outer circumferential surface of the collecting roller 243 and further can prevent the passage of the additive of the toner through the blade 244. As a result, unlike the comparative example described above, the image forming apparatus 1 of this embodiment can prevent occurrence of, for example, a striped scratch on the intermediate transfer belt 125 made by the additive and can prevent occurrence of image failure caused by the toner. Moreover, as described above, in this embodiment, the surface roughness of the outer circumferential surface of the collecting roller 243 can partially be changed to thereby resolve the problem which has occurred in the typical cleaning device and the typical image forming apparatus, which therefore permits formation of the cleaning device 240 and the image forming apparatus 1 with high performance without increasing a number of components.

The typical cleaning device collects and removes not only the toner remaining on the intermediate transfer belt but also the paper powder on the intermediate transfer belt.

The typical cleaning device may face paper powder jamming between the collecting roller and the backward flow prevention sheet (seal) which partitions the collecting roller and the toner storage section. Thus, in the typical cleaning device, the small gap may be formed between the collecting roller and the backward flow prevention sheet by the jammed paper powder, and the toner collected by the collecting roller may flow backward towards the intermediate transfer belt through the aforementioned gap.

Moreover, to solve the paper powder jamming as described above, it is possible to make the outer circumferential surface of the collecting roller rough to form the outer circumferential surface into a greatly uneven shape, thereby improving the power of the paper powder conveyance by the collecting roller. However, in a case where the outer circumferential surface of the collecting roller is made rough as described above, the abrasion at the tip part of the blade abutting the outer circumferential surface increases, greatly decreasing the life of the blade.

On the contrary, it is possible in this embodiment to improve the power of the paper powder conveyance by the collecting roller with the simple configuration to prevent the toner backward flow towards the intermediate transfer belt and at the same time suppress a decrease in the life of the blade.

Note that this disclosure is not limited to the configuration of the embodiment described above, and various modifications thereto can be made.

Modified Embodiment

Figure 7A:
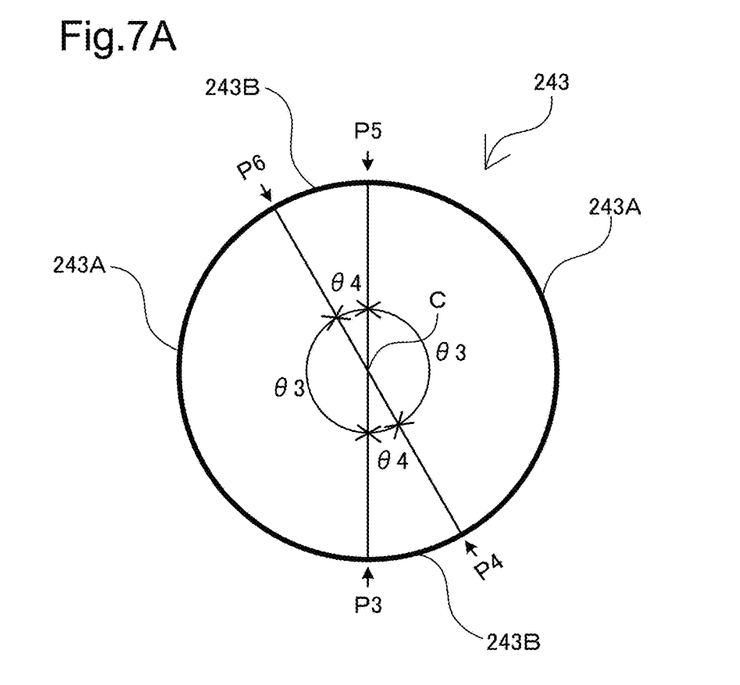
FIG. 7A is a plan view describing configuration of a modified embodiment of the collecting roller of the cleaning device according to one embodiment of this disclosure.
Figure 7B:
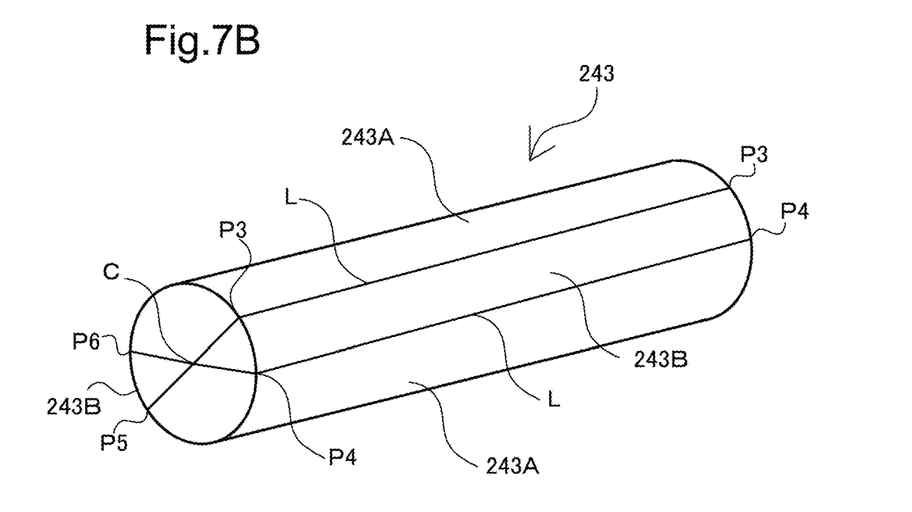
FIG. 7B is a perspective view describing configuration of the modified embodiment of the collecting roller of the cleaning device according to one embodiment of this disclosure.

The embodiment has been described above, referring to a case where one first outer circumferential region 243A and one second outer circumferential region 243B are provided on the outer circumferential surface of the collecting roller 243, but this disclosure is not limited to this case, and the second outer circumferential region 243B may be provided at a plurality of portions. For example, as illustrated in FIGS. 7A and 7B, the first outer circumferential region 243A and the second outer circumferential region 243B may each be provided at two portions on the outer circumferential surface of the collecting roller 243. Specifically, one of the first outer circumferential regions 243A is a surface region which is formed on the outer circumferential surface of the collecting roller 243 and which extends clockwise (that is, a right rotation direction in FIG. 7A) from a point P3 on the aforementioned outer circumferential surface to a point P6 on the aforementioned outer circumferential surface. A width of this first outer circumferential region 243A in the aforementioned circumferential direction is defined by the rotation center C of the collecting roller 243, a center angle θ3 formed by the points P3 and P6, and the dimension L in the axial direction of the collecting roller 243. Moreover, another one of the first outer circumferential regions 243A is a surface region which is formed on the outer circumferential surface of the collecting roller 243 and which extends clockwise (that is, the right rotation direction in FIG. 7A) from a point P5 on the aforementioned outer circumferential surface to a point P4 on the aforementioned outer circumferential surface. A width of this first outer circumferential region 243A in the aforementioned circumferential direction is defined by the rotation center C of the collecting roller 243, the center angle θ3 formed by the points P5 and P4, and the dimension L in the axial direction of the collecting roller 243.

Moreover, one of the second outer circumferential regions 243B is a surface region which is formed on the outer circumferential surface and which extends counterclockwise (that is, a left rotation direction of FIG. 7A) from the point P3 to the point P4. A width of this second outer circumferential region 243B in the aforementioned circumferential direction is defined by the rotation center C, the center angle θ4 formed by the points P3 and P4, and the dimension L in the axial direction of the collecting roller 243. Moreover, another one of the second outer circumferential regions 243B is a surface region which is formed on the outer circumferential surface and which extends counterclockwise (that is, the left rotation direction of FIG. 7A) from the point P5 to the point P6. A width of this second outer circumferential region 243B in the aforementioned circumferential direction is defined by the rotation center C, the center angle θ4 formed by the points P5 and P6, and the dimension L in the axial direction of the collecting roller 243. Then as illustrated in FIG. 7A, in these first outer circumferential regions 243A and second outer circumferential regions 243B, the center angle θ4 is set smaller than the center angle θ3, so that a total width of the second outer circumferential regions 243B at the two portions is smaller than a total width of the first outer circumferential regions 243A at the two portions. Providing the second outer circumferential region 243B at the two portions on the outer circumferential surface of the collecting roller 243 as described above permit efficient paper powder conveyance and more reliable prevention of paper powder jamming between the collecting roller 243 and the seal 246.

Note that the above description refers to a case where the cleaning device of this disclosure is applied to the intermediate transfer belt serving as an image carrier, but this disclosure is not limited thereto, and it is also applicable to, for example, a photoconductive drum serving as an image carrier.

Moreover, the above description refers to a case of application to the cleaning device having the contact member, but this disclosure is not limited thereto, and is also applicable to a cleaning device having no contact member.

Moreover, the configuration and processing indicated by the embodiment described above with reference to FIGS. 1 to 7 are each just one embodiment of this disclosure, and it is not intended in any way to limit this disclosure to the aforementioned configuration and processing.

While the present disclosure has been described in detail with reference to the embodiments thereof, it would be apparent to those skilled in the art the various changes and modifications may be made therein within the scope defined by the appended claims.

What is claimed is:

1. A cleaning device comprising:
a removal roller rotating around a first rotary shaft extending widthwise of an image carrier while making contact with the image carrier to remove a toner and a paper powder remaining on the image carrier;
a collecting roller making contact with the removal roller while rotating around a second rotary shaft parallel to an axial direction of the first rotary shaft to collect the toner and the paper powder on the removal roller;
a blade extending in parallel to an axial direction of the second rotary shaft, the blade making contact with the collecting roller to scrape off the toner and the paper powder on the collecting roller; and
a toner storage section being partitioned from the removal roller and the collecting roller by a seal extending in parallel to the first rotary shaft and the second rotary shaft, the toner storage section storing the toner and the paper powder collected by the collecting roller and scraped off by the blade, wherein
the removal roller and the collecting roller have no relationship such that a rotation speed or a diameter of one of the removal roller and the collecting roller is an integral multiple of a rotation speed or a diameter of another one of the removal roller and the collecting roller,
provided on an outer circumferential surface of the collecting roller in a circumferential direction of the collecting roller are: a first outer circumferential region having a predefined first surface roughness and extending in the axial direction of the second rotary shaft; and a second outer circumferential region having a greater predefined second surface roughness than the first surface roughness and extending in the axial direction of the second rotary shaft, and
a width of the second outer circumferential region in the circumferential direction is smaller than a width of the first outer circumferential region in the circumferential direction.

2. The cleaning device according to claim 1, wherein the second outer circumferential region is provided at a plurality of portions on the outer circumferential surface of the collecting roller in the circumferential direction of the collecting roller.

3. The cleaning device according to claim 1, wherein the predefined first surface roughness in the first outer circumferential region corresponds to a value in a range between 1.2 and 4.0 with ten-point average roughness.

4. The cleaning device according to claim 1, wherein the predefined second surface roughness in the second outer circumferential region corresponds to a value in a range between 3.0 and 6.0 with ten-point average roughness.

5. The cleaning device according to claim 1, wherein the image carrier is an intermediate transfer belt on an outer circumferential surface of which a toner image is transferred from an image formation unit,
further provided is a contact member making contact with the intermediate transfer belt while being pressed towards the intermediate transfer belt with a predefined pressure by a pressing member to charge the toner remaining on the intermediate transfer belt, and the removal roller removes the paper powder on the intermediate transfer belt and the toner charged by the contact member while making contact with the intermediate transfer belt.

6. The cleaning device according to claim 5, further comprising
a power supply device applying a voltage to the contact member.

7. The cleaning device according to claim 1, wherein the image carrier is a photoconductive drum.

8. An image forming apparatus comprising:
an image formation section including the image carrier; and
the cleaning device according to claim 1, wherein
the toner and the paper powder remaining on the image carrier are removed by the cleaning device.

* * * * *